(12) United States Patent
Islam et al.

(10) Patent No.: US 6,480,656 B1
(45) Date of Patent: Nov. 12, 2002

(54) METHOD AND SYSTEM FOR GENERATING A BROADBAND SPECTRAL CONTINUUM, METHOD OF MAKING THE SYSTEM AND PULSE-GENERATING SYSTEM UTILIZING SAME

(75) Inventors: Mohammed N. Islam, Ann Arbor, MI (US); George A. Nowak, Ann Arbor, MI (US); Jaeyoun Kim, Ann Arbor, MI (US)

(73) Assignees: The Regents of the University of Michigan, Ann Arbor, MI (US); The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/253,852

(22) Filed: Feb. 19, 1999

(51) Int. Cl.⁷ .................................................. G02B 6/16
(52) U.S. Cl. ........................................ 385/123; 372/25
(58) Field of Search ............................ 359/154; 372/24, 372/25, 26, 96; 385/123–130, 140, 147

(56) References Cited

U.S. PATENT DOCUMENTS 5,631,758 A * 5/1997 Knox et al. .................. 359/124

OTHER PUBLICATIONS

Femosecond distributed solition spectrum in fibers, By Islam et al , 1989 Optical Society of America vol. 6, No. 6/Jun. 1989/L.Opt. Soc. Am.B pp. (1149–1158).*
P. Beaud, et al., "Ultrashort Pulse Propagation, Pulse Breakup, and Fundamental Soliton Formation in a Single–Mode Optical Fiber", IEEE, 1987.
K.J. Blow, et al., "Suppression of the Solition Self–Frequency Shift by Bandwidth–Limited Amplification", Optical Science of America, Jun. 1988, vol. 5., No. 6.

M. N. Islam, et al., "Femtosecond Distributed Solition Spectrum in Fibers", Optical Society of America, 1989, vol. 6., No. 6.
K. Mori, et al., "Flatly Broadened Supercontinuum Spectrum Generated in a Dispersion Decreasing Fibre With Convex Dispersion Profile", Electronics Letters, Oct. 9, 1997, vol. 33, No. 21.
J.W. Lou, et al., "Broader and Flatter Supercontinuum Spectra In Dispersion–Tailored Fibers", Technical Digest, 1997.
Masataka Nakazawa, et al., "Coherence Degradation in the Process of Supercontinuum Generation in an Optical Fiber", Optical Fiber Technology, 1998, Article No. OF980253.

(List continued on next page.)

*Primary Examiner*—Akm E. Ullah
(74) *Attorney, Agent, or Firm*—Brooks & Kushman P.C.

(57) ABSTRACT

A method and system are disclosed for generating a broadband spectral continuum using short spans of constant-dispersion, dispersion-shifted fibers. The continuum generation results from the combined effects of pulse compression and spectral shaping. Pulse compression is achieved through soliton-effect compression in one or more stages of anomalous dispersion fiber, which lengths are determined by the occurrence of the first optimal compression of the corresponding order of soliton. The spectral shape results from 3rd order dispersion effects on the evolution of the pulse shape as it propagates through the final segment(s) of the fiber span. The pulse area of the incident pulse determines the fiber properties required to optimize compression. The sign and magnitudes of the 2nd and 3rd order dispersions in the final span(s) as well as the pulse width at the input to the final span determine the continuum extent, flatness and symmetry. The continuum generated in this manner is coherent and stable, making it an attractive alternative as a spectrally-sliced source for short pulse, multiple wavelength channels.

33 Claims, 8 Drawing Sheets

OTHER PUBLICATIONS

A.S. Gouveia–Neto, et al., "Femtosecond Soliton Raman Generation", IEEE Journal of Quantum Electronics, Feb. 2, 1988, vol. 24, No. 2.

K.L. Vodop'Yanov, et al., "Generation of Pulses of 100–200 F Sec Duration by Stimulated Raman Scattering in a Single–Mode Fiber Waveguide at Wavelengths 1.5–1.7", So. J. Quantum Electron, Oct. 1987.

T. Morioka, et al., "Nearly Penalty–Free, <4ps Supercontinuum Gibt/s Pulse Generation Over 1535–1560nm", Electronic Letters, May 12, 1994.

Toshiaki Okuno, et al., "Generation of Ultra–Broad–Band Suepercontinuum by Dispersion–Flattened and Decreasing Fiber", IEE Photonics Technology Letter, Jan. 19, 1998, vol. 10., No. 1.

H. Sotobayashi, et al., "325nm Bandwidth Supercontinuum Generation at 10 Gbit/s Using Dispersion–Flattened and Non–Decreasing Normal Dispersion Fibre With Pulse Compression Technique", Electronics Letters, Jun. 25, 1998, vol. 34, No. 13.

Yuichi Takushima, et al., "Generation of Over 140–nm–Wide Super–Continuum From a Normal Dispersion Fiber By Using a Mode–Locked Semiconductor Laser Source", IEEE Photonics Technology Letters, Nov. 11, 1998, vol. 10, No. 11.

T. Morioka, et al., "1 Tbit/s (100 Gbit/s×10 Channel) OTDM/WDM Transmission Using A Single Supercontinuum WDM Source", Electronics Letter, May 9, 1996, vol. 32, No. 10.

Sanjok, H., et al., Multiwavelength Light Source with Precise Frequency Spacing Using a Mode–Locked Semiconductor Laser and an Arrayed Waveguide Grating Filter, IEEE Photonics Technology Letters, vol. 9 No. 6, Jun. 1997.

Veselka, J.J., et al., A Multiwavelength Source Having Precise Spacing for WDM Systems, IEEE Photonics Technology Letters, vol. 10, No. 7, Jul. 1998.

* cited by examiner

W/PRE-TAILORING

METHOD AND SYSTEM FOR GENERATING A BROADBAND SPECTRAL CONTINUUM, METHOD OF MAKING THE SYSTEM AND PULSE-GENERATING SYSTEM UTILIZING SAME

GOVERNMENT RIGHTS

This invention was made with government support under AFOSR Grant F30602-97-1-0202. The government has certain rights in the invention.

TECHNICAL FIELD

This invention relates to methods and systems for generating a broadband spectral continuum, methods of making the systems and pulse-generating systems utilizing same.

BACKGROUND ART

The bandwidth demands projected for the near future will require multi-Tb/s TDM/WDM systems that are based on numerous high bit-rate channels. A supercontinuum (SC) generated in optical fiber is a convenient source for such systems because it provides a very broad bandwidth (>200 nm) that can be sliced, as required, into short pulses at individual WDM channels as illustrated in FIG. 1. The pulse trains in each channel have the repetition rate of the source laser and, when the spectrum is flat and of uniform phase, pulse widths that are transforms of the spectral filter function. These features make the continuum source an attractive alternative to numerous discrete laser diodes, particularly for high bit-rate OTDM systems, since a single short pulse source provides chirp-free, ultra-short pulses simultaneously for multiple wavelength channels. Also, the SC source requires the relatively simpler stabilization of passive filters rather than of the operating wavelengths of multiple laser diodes. Finally, since the SC has a continuous high power spectral density outside the erbium gain band compared with thermal sources or superluminescent LEDs, it is also useful for characterizing passive components and amplifiers in new spectral regions.

Work in the 1980's first explored continuum generation in fibers. Working in the anomalous group-velocity dispersion (GVD) regime of fibers, several groups generated short pulses with extremely broad bandwidth, which they attribute to stimulated Raman scattering. Using 100-psec pulses from a Nd:YAG laser, Gouveia-Neto et al. obtained a spectrum between 1.32 and 1.54 $\mu$m.

By frequency doubling a 2.79 $\mu$m YSGG:$Cr^{3+}$:$Er^{3+}$ laser, Vodop'yanov et al. generated 100–200 fsec pulses between 1.5 and 1.7 $\mu$m.

On the other hand, Beaud et al. witnessed pulse breakup when 0.83-psec pulses from a 1.37 $\mu$m dye laser were passed through a fiber.

Blow et al. tried to reconcile the difference between broad bandwidth and pulse breakup by theorizing that the frequency shift can be suppressed by Raman gain.

Islam et al. developed a model of the femtosecond distributed soliton spectrum (FDSS) that does not rely on stimulated Raman scattering at its peak (~440 $cm^{-1}$ below the pump frequency) but did explain all three of the above experiments. In particular, Islam et al. generated pulses with duration larger than ~100-fsec between 1.55 and 1.85 $\mu$m in a fiber pumped by a color center laser. The experiments and computer simulations showed that in the anomalous GVD regime, the narrow pulses evolve from multi-soliton collisions initiated by modulational instability and soliton self-frequency shift effects. These experiments were conducted in fiber lengths of 100 to 500 m of single mode, polarization-maintaining fiber. Cross-correlation measurements suggest that there is little or no correlation between spectral components of the FDSS that are separated by more than the 100-fsec pulse bandwidth. The experiments support a model of the FDSS as an ensemble average over fundamental solitons that have frequency shifted by different amounts.

More recently, Morioka et al. studied 1 Tb/s (100 Gb/s×10 channels) TDM/WDM transmission using a single SC WDM source. In particular, and as illustrated in FIG. 2, their SC is generated in 3 km of fiber, and their SC source has a bandwidth >200 nm. Also, they used dispersion decreasing fiber with the third order dispersion flattened. Their pulses are compressed using adiabatic soliton compression (ASC) and spectral shaping is achieved through normal GVD propagation.

The most striking feature of the Morioka et al. SC is that it can generate short pulses <0.3 ps over the continuous spectral range, and that multi-wavelength, transform-limited short pulses can easily be selected by filtering with passive optical filters as illustrated in FIG. 1. The optical frequency stability of the filtered channels was quite high (~1 GHz/C), determined by that of the filtering devices. Morioka demonstrated 100 Gb/s×10 channel optical signal generation and error-free transmission of all the 100 Gb/s×10 channels over 40 km of DS fiber using the low-noise SC WDM source with a newly developed array-waveguide grating demultiplexer and multiplexer. ASC derives from a fundamental N=1 soliton's tendency to decrease its pulse width to maintain a constant area in response to gradually decreasing dispersion or increasing energy with propagation. When resulting from a dispersion-decreasing fiber the amount of compression depends on the ratio of the initial to final dispersions. In addition, by using a fiber in which the 3rd order dispersion is flattened near the center wavelength and symmetrically concave about it, the spectrum broadens symmetrically. Also, in fiber with flattened 3rd order dispersion, stimulated Raman scattering is the dominant higher-order mechanism that shapes the continuum. Therefore, for continuum generation based on ASC in long fibers, optimization generally requires:

operation over the fiber length in both the normal and anomalous dispersion regimes;

specially designed dispersion fiber; and suppression of the 3rd order dispersion.

A group at the University of Michigan has further optimized the SC generation in long fibers by using dispersion decreasing (DD) fibers. Using DD fiber can enhance the SC generation process. For example, using 3.3 km of DD fiber with 24.3W peak input power, one can obtain 100 nm SC that is flat over more than 20 nm and twice as broad and more uniform spectrum than dispersion-increasing or constant dispersion fiber. The DD fiber generates a broader and smoother spectrum than the other fibers because the changing zero dispersion wavelength enhances the generation of new frequencies, as self-phase modulation effects are more efficient near the zero dispersion wavelength.

Following the University of Michigan group's work on dispersion tailored fibers for continuum generation, a number of groups have studied optimization of the continuum in kilometer lengths of specialty dispersion fibers. K. Mori et al. show that the SC spectrum can be optimized by using DD fiber in which the dispersion is a convex function of frequency with two zero-dispersion wavelengths.

Okuno et al. show experimentally the generation of 280 nm wide continuum by using a kilometer length of dispersion-flattened and decreasing fiber. As illustrated in FIG. 5, pulses are compressed by adiabatic soliton compression. Spectral shaping is accomplished through normal GVD propagation.

In contrast, Sotobayashi and Kitayama demonstrate 325 nm wide continuum by using a two state set-up: the first stage for pulse compression and the second stage for continuum generation. As illustrated in FIG. 4, pulses are compressed by soliton-effect compression and spectrum shaping is accomplished through normal GVD propagation. The pulses are first compressed in a 4 km length of fiber with anomalous dispersion through the higher-order soliton compression effect. Then, continuum is generated in a 2 km length of dispersion-flattened fiber that has a constant normal dispersion throughout the fiber length.

In a similar fashion, Takushima et al. generate over 140 nm-wide supercontinuum from a normal dispersion fiber by using a mode-locked semiconductor laser source. In their two-stage set-up, the pulses are first compressed through the adiabatic soliton compression technique in a 10.2 km length of DD fiber as illustrated in FIG. 3. An EDFA is used to boost the signal after the compression, and the output is then fed into a 1.7 km length of dispersion-flattened fiber with normal dispersion to generate the continuum through normal GVD propagation.

All of the experiments illustrated in FIGS. 2–5 however require some type of non-commercial, specialty fiber.

Although continuum sources have been demonstrated as described above, the problem has been that fiber lengths of typically 3 km have been required. This long fiber length leads to several problems: (a) the timing of pulses at different wavelengths is different, depending on where the spectrum is generated in the fiber; (b) the mechanisms are difficult to isolate since the long fiber is highly nonlinear; (c) the continuum is sensitive to polarization and environmental fluctuations; and (d) timing jitter results from the long interaction length with amplified spontaneous emission and dispersive waves.

DISCLOSURE OF INVENTION

An object of the present invention is to provide a method and system for generating a broadband spectral continuum, a method of making the system and pulse-generating system utilizing same wherein the continuum is generated in short lengths of optical fiber that can provide multiple wavelengths with single channel repetition rates of 1–100 Gb/s or higher.

Another object of the present invention is to provide a method and system for generating a broadband spectral continuum, a method of making the system and a pulse-generating system utilizing same wherein the continuum is generated using a multi-stage, soliton-effect compression.

Still another object of the present invention is to provide a method and system for generating a broadband spectral continuum, a method of making the system and a pulse-generating system utilizing same wherein the continuum is generated almost exclusively by self-phase modulation (SPM) and is shaped primarily by second and third order dispersion effects.

In carrying out the above objects of the present invention, a method for generating a broadband spectral continuum from a higher-order soliton pulse is provided. The method includes the steps of compressing the higher-order soliton pulse in a temporal domain through soliton-effect compression to obtain a compressed soliton pulse having a spectrum and breaking up the compressed soliton pulse to shape the spectrum of the compressed soliton pulse through higher order dispersion effects and self-phase modulation to obtain the broadband spectral continuum.

Preferably, the step of compressing includes the step of launching the higher-order soliton pulse into a first end of an anomalous dispersion fiber including at least one pulse compression stage having a length based on the order of the soliton pulse and a spectral shaping stage.

Also, preferably, the step of breaking up is performed adjacent a second end of the anomalous dispersion fiber in the spectral shaping stage.

The spectral shaping stage may be a dispersion-shifted optical fiber section of the anomalous dispersion fiber and the step of compressing may be performed in multiple pulse compression stages of the anomalous dispersion fiber.

Preferably, the higher order dispersion effects include third order dispersion effects and the shape of the broadband spectral continuum is based primarily on the sign and magnitude of third order dispersion of the spectral shaping stage adjacent the second end.

The shape of the broadband spectral continuum is also based on pulse width of the compressed soliton pulse immediately prior to the step of breaking up. The dispersion effects include second and third order dispersion effects. The magnitude of the second order dispersion and the magnitude of the third order dispersion normalized by the pulse width have substantially the same order of magnitude adjacent the second end of the anomalous dispersion fiber in the spectral shaping stage. Preferably, the spectral continuum is greater than 10 nm wide.

Further in carrying out the above objects and other objects of the present invention, a system for generating broadband spectral continuum from a higher-order soliton pulse is provided. The system includes at least one pulse compression stage of anomalous dispersion fiber having a length based on the order of the soliton pulse for compressing the soliton pulse through soliton-effect compression to obtain a compressed soliton pulse having a spectrum. The system also includes a spectral shaping stage of the anomalous dispersion fiber optically coupled to the at least one pulse compressor stage of anomalous dispersion fiber for breaking up the compressed soliton pulse adjacent an output end of the fiber to shape the spectrum of the compressed soliton pulse through higher order dispersion effects and self-phase modulation to obtain the broadband spectral continuum.

Preferably, the at least one pulse compression stage of anomalous dispersion fiber has a dispersion which is relatively constant therein.

Also, preferably, the anomalous dispersion fiber has a second pulse compression stage less than 100 meters in length and may be less than 10 meters in length.

The dispersion effects include third order dispersions having a sign and a magnitude. The sign may be positive or negative.

The system may have a plurality of pulse compression stages of anomalous dispersion fiber for compressing the soliton pulse through soliton-effect compression to obtain the compressed soliton pulse. Preferably, the length of the at least one pulse compression stage of anomalous dispersion fiber is based on a minimal width of the compressed soliton pulse.

Still further in carrying out the above objects and other objects of the present invention, a system for generating pulses substantially simultaneously on multiple channels at multiple wavelengths and at repetition rates of at least 1 Gb/s per wavelength channel is provided. The system includes a soliton pulse generator including a single laser for generating soliton pulses and an optical fiber including at least one pulse compression stage and a spectral shaping stage. The at least one pulse compression stage receives the soliton pulses at a first end of the fiber. The spectral shaping stage generates a broadband spectral continuum within the fiber and provides the broadband spectral continuum at a second end of the fiber. The system also includes a plurality of filters coupled to the second end of the fiber for carving broadband coherent outputs from the broadband spectral continuum to obtain pulses having multiple wavelengths and repetition rates of at least 1 Gb/s per wavelength channel.

The single laser may be a single mode-locked laser such as a mode-locked erbium-doped fiber laser.

The plurality of filters may comprise a plurality of passive filters. The passive filters set wavelength stability and the pulses' spectral and temporal widths.

Preferably, the length of the spectral shaping stage is less than 10 meters and may be a dispersion-shifted fiber.

The optical fiber may be a polarization preserving fiber.

The optical fiber may be a high-nonlinearity fiber, in which $$\gamma > 2.2 \text{ km}^{-1} W^{-1}; \quad \gamma = \frac{2\pi \cdot n_2}{\gamma(A_{\mathit{eff}})}$$

The soliton pulse generator may also include a polarization controller and a fiber amplifier such as an erbium-doped fiber amplifier.

Yet still further in carrying out the above objects and other objects of the present invention, a method is provided of making an anomalous dispersion fiber including at least one pulse compression stage for generating a compressed soliton pulse having incident pulse energy, $P_o$, and pulse width, $\tau$, from a higher-order, N soliton pulse also having incident pulse energy, $P_o$, and pulse width, $\tau$. The fiber also includes a spectral shaping stage for generating a broadband spectral continuum from the compressed soliton pulse. The method includes the steps of determining compression parameters including dispersion, D, and length, L, for the at least one pulse compression stage based on $P_o$ and $\tau$ of the higher-order soliton pulse. The method also includes the step of determining shaping parameters including D, L, and dD/dλ for the spectral shaping stage based on $\tau$, $P_o$ and chirp, C, of the compressed soliton pulse. Still further, the method includes the steps of providing the at least one pulse compression stage having the compression parameters and the spectral shaping stage having the shaping parameters. Finally, the method includes the step of optically coupling the at least one pulse compression stage and the spectral shaping stage together to obtain the anomalous dispersion fiber.

Preferably, 300 fsec≦τ (of the higher-order soliton pulse) ≦3 psec.

Also, preferably $P_o$ (of the higher-order soliton pulse) ~1.5≦N≦4 where:

$$N = \left[\frac{2\pi c \gamma P_0 \left(\frac{\tau}{1.763}\right)}{\lambda^2 |D|}\right]^{1/2}$$

Preferably, D (of the at least one pulse compression stage) is ≧2 ps/nm-km.

Also, preferably, L (of the at least one pulse compression stage) is 2–100 m.

Preferably, τ (of the compressed soliton pulse) ≦300 fsec.

Also, preferably, $P_o$ (of the compressed soliton pulse) ~1.5≦N≦4.

Preferably, D (of the spectral shaping stage) is 0.2–2 ps/nm-km.

Also, preferably, dD/dλ is ±0.01–0.07 ps/nm²-km.

Preferably, L of the spectral shaping stage is 0.3–100 m.

Also, preferably, C is linear and −1≦C≦1 where C=(ΔωΔτ)²−1.

In contrast to the prior art, the method and system of the present invention require only several meters of fiber. In preliminary experiments, 2.5 m of standard fiber followed by 2 m of dispersion-shifted (DS) fiber generate more than 200 nm of spectral continuum that is flat to less than ±0.5 dB over 60 nm as illustrated in FIG. 7. The continuum exhibits excellent piecewise coherence as evidenced by obtaining <500 fs pulses that are pedestal-free to >28 dB, even when the spectrum is carved more than 70 nm from the pump wavelength. Also, the timing jitter of the carved pulses indicates no degradation compared to the source laser. Experiments match simulations well and indicate that the continuum is generated almost exclusively by self-phase modulation (SPM) and is shaped primarily by 3rd order dispersion effects.

By using multi-stage soliton compression in this approach, the continuum is generated in conventional fibers that are almost three orders-of-magnitude shorter in length than those used in related experiments, which are based on adiabatic soliton compression in specialty, dispersion-tailored fibers. As a consequence, a very stable source is obtained that has potential applications in high-capacity TDM/WDM applications. The short fiber continuum has:

multi-wavelengths that are generated coincident in time;

well-understood and controllable mechanisms underlying the continuum generation;

minimal interaction between the pulse and dispersive or incoherent energy;

high spectral coherence and low timing jitter; and stability against mechanical and environmental fluctuations.

As compared with the prior art on supercontinuum generation in kilometer lengths of fiber, the present invention is novel because it relies on a different soliton compression mechanism and can be achieved in commercially available fibers. Whereas the continuum generation in kilometer lengths of fiber relies typically on adiabatic soliton compression (ASC), continuum generation in meter lengths of fiber relies on soliton-effect compression (SEC). Pulse compression is a key mechanism to continuum generation because the ideal continuum is the transform of a pulse of negligible temporal extent.

SEC typically requires launching of higher-order (N≧1.5) solitons, which periodically compress and expand with propagation in the anomalous dispersion regime of a fiber. Depending on the soliton order, the pulse achieves a minimal width at some fraction of the soliton period. When the fiber is cut at the length corresponding to a minimum width location, a broadened spectrum corresponding to the compressed pulse is obtained. To first order, only SPM contributes to the spectral broadening. Also, in DS fibers with relatively low magnitude of dispersion (i.e., D ~0.2–2 ps/nm-km), the 3rd order dispersion is the dominant higher-order mechanism that affects pulse compression and, therefore, determines the spectral profile of the continuum.

Comparing ASC with SEC, SEC in the short fiber case of the present invention provides higher compression ratios than are possible with ASC and leads to super-broadened spectra in just a fraction of the soliton period. ASC requires a longer fiber because the dispersion must decrease gradually over the soliton period. Moreover, SEC is achievable in conventional, constant-dispersion DS fiber, allowing for simple implementation. While SEC does result in pedestal wings in the time domain (which means that some of the pulse energy does not contribute to the continuum generation), for soliton orders up to N~4, the fraction of energy remaining in the wings at maximum compression is below 25 percent. In both SEC and ASC, the spectrum broadens symmetrically for an unchirped and symmetric pulse, until a higher-order dispersion or non-linear mechanism becomes significant at a sufficiently short pulse width and high peak power.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
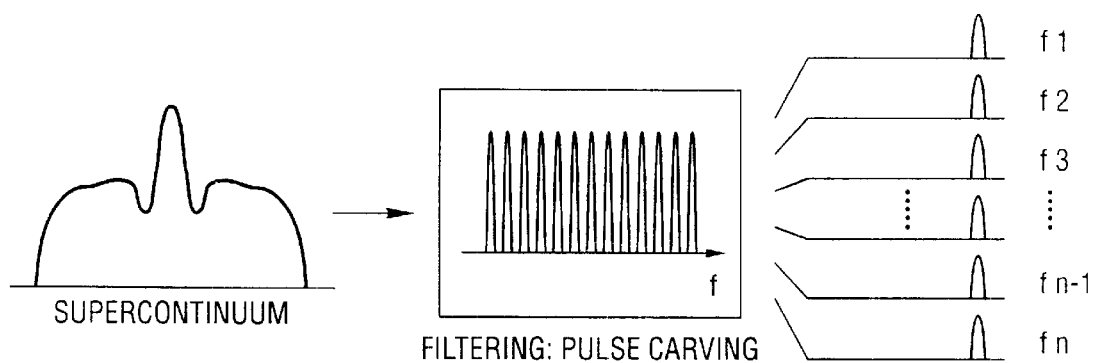
FIG. 1 is a schematic diagram of a system for simultaneously generating WDM pulses from a supercontinuum.
Figure 2:
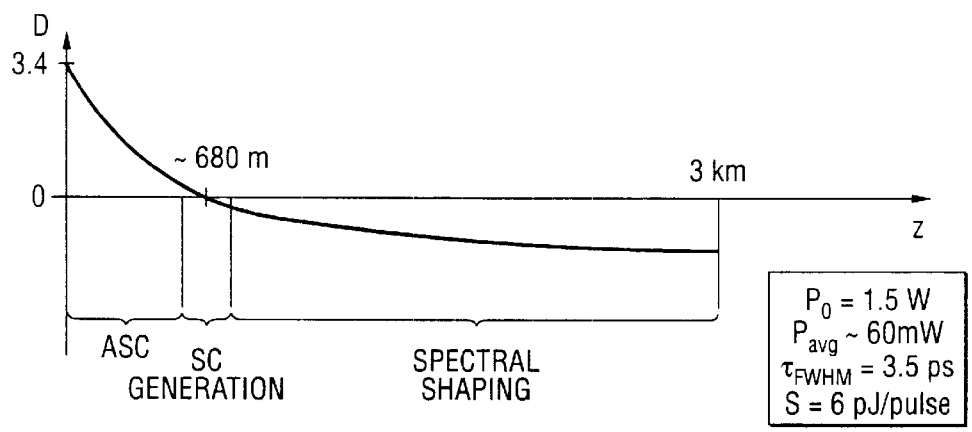
FIG. 2 is a graph of dispersion versus length of optical fiber for one piece of prior art.
Figure 3:
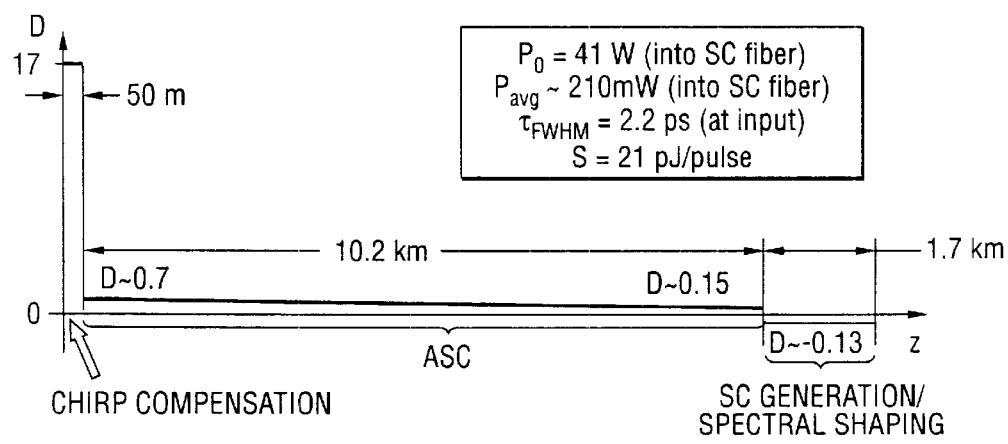
FIG. 3 is a graph similar to the graph of FIG. 2 for another piece of prior art.
Figure 4:
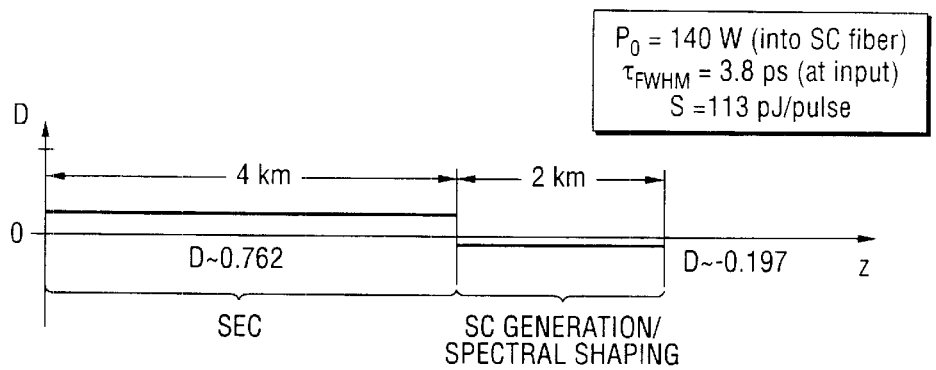
FIG. 4 is a graph similar to the graph of FIG. 2 for yet another piece of prior art.
Figure 5:
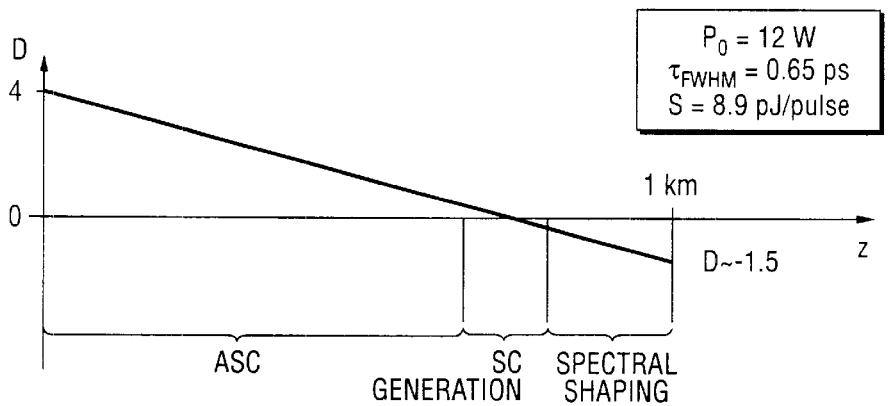
FIG. 5 is a graph similar to the graph of FIG. 2 for still another piece of prior art.
Figure 6:
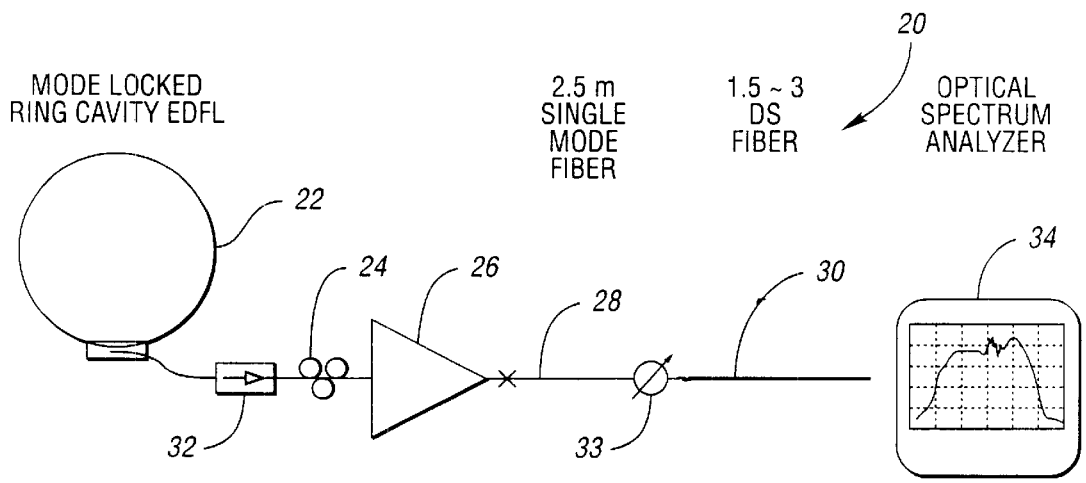
FIG. 6 is a schematic diagram of a system constructed in accordance with the present invention and illustrating a broadband spectral continuum generated thereby on an optical spectrum analyzer.

Referring now to FIG. 6, there is illustrated a system, generally indicated at 20, for generating a broadband spectral continuum in accordance with the present invention. Obviously, the parameters associated with the system 20 may vary and the parameters noted below are mere examples. The system 20 includes passively mode-locked ring cavity erbium-doped fiber laser 22 which generates a 15 MHz train of 400–470 fsec, transform-limited, hyperbolic-secant soliton pulses centered at 1560 nm. The system also includes an isolator 32. The pulses broaden dispersively to ~980 fs with propagation through 5.1 m of SMF-28 fiber pigtails and a polarization controller 24. An erbium-doped fiber optical amplifier (EDFA) 26 consisting of 1.5 m of 2000 ppm-doped Er gain fiber amplifies the signal to an average power of 5 mW.

Following the EDFA 26, the pulse is compressed to ~120 fsec through soliton effect compression in 2–2.5 m of standard single mode optical fiber which comprises a pulse compression stage 28. The compressed pulse is then launched into a 1.5–3 m DS fiber or pulse shaping stage 30 with D=0.76 ps/nm-km and a dispersion slope of ~0.056 $ps/nm^2$-km. The polarization controller 24 sets the state of the signal polarization at the input to the EDFA 26, and a variable attenuator 33 sets the signal power. The variable attenuator 33 is located between the pulse compression stage 28 and the pulse shaping stage 30. Diagnostics consist of an optical spectrum analyzer 34, autocorrelator (not shown), fast photodiode (not shown) and RF spectrum analyzer (not shown).

Figure 7:
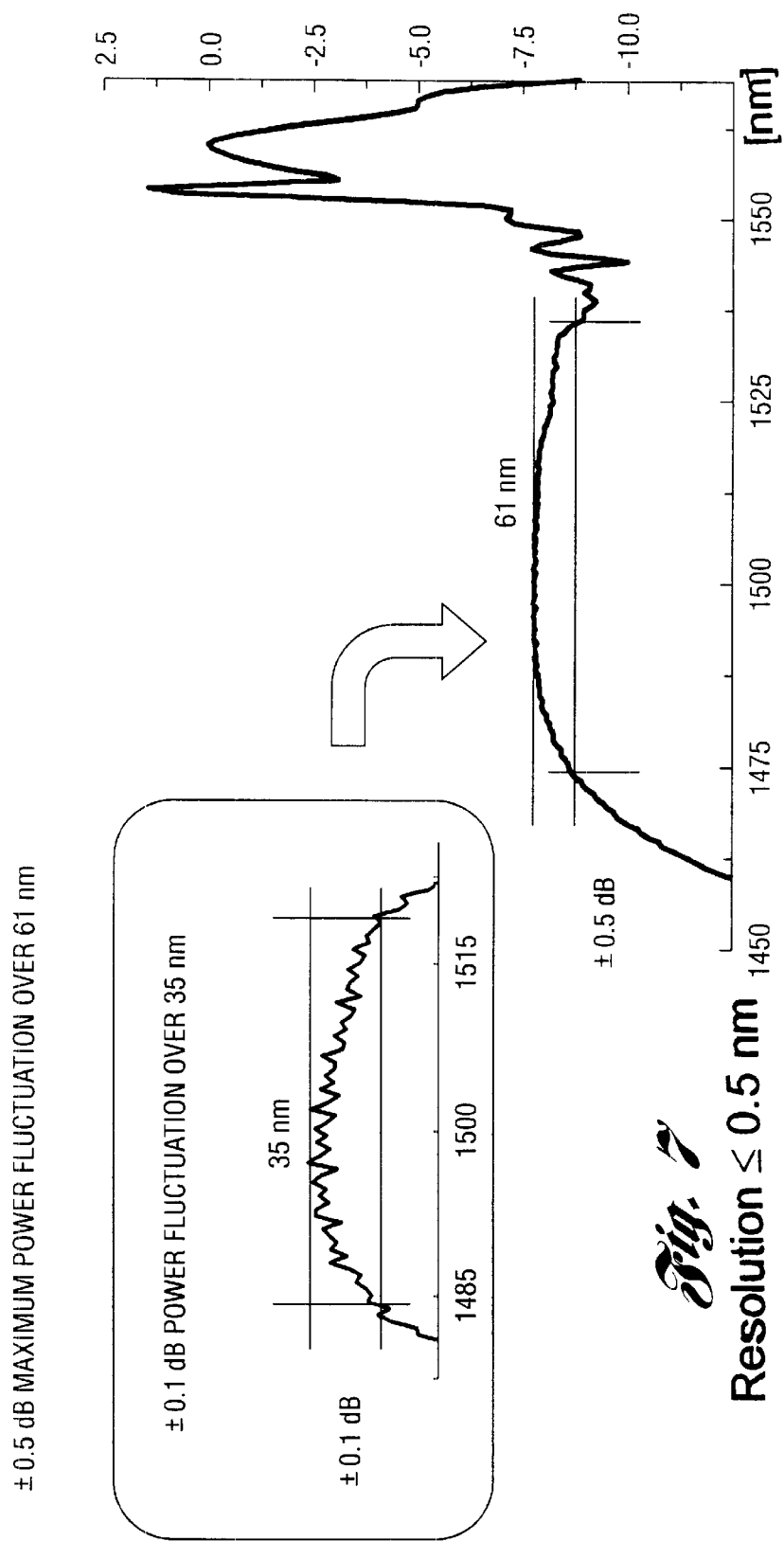
FIG. 7 illustrates a pair of graphs, one of which blows up a portion of the other, of a spectrally flat portion of a supercontinuum generated in 2 m of fiber of the present invention.

A sample continuum generated by an average signal input power of 3.2 mW is indicated in FIGS. 6 and 7. The continuum has a 20 dB bandwidth of 211 nm (i.e. FIG. 6) and a 61 nm wide spectral region between 1475 to 1535 nm that is flat to with ±0.5 dB (FIG. 7). The continuum has a 35 mm width spectral region between 1485 to 1520 that is flat to with ±0.1 dB (inset, FIG. 7). The power spectral density across the flat region is approximately −18 dBm/nm. The peak in the vicinity of 1560 nm includes low intensity energy that was not compressed in the soliton, amplified spontaneous emission, and seed pulse energy that is polarized orthogonally to the continuum.

Figure 8:
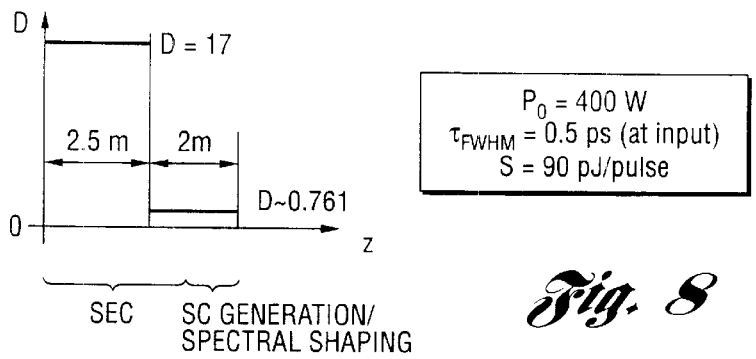
FIG. 8 is a graph similar to the graph of FIG. 2 for the method and system of the present invention.

FIG. 8 is similar to FIGS. 2–5 and provides a ready comparison of the dispersion and fiber length of the optical fiber of the present invention versus the prior art's dispersion and fiber lengths. In particular, FIG. 8 illustrates constant dispersion in normal $\beta_3$ fiber, high-order soliton pulse compression through soliton effect compression (i.e. SPM+ anomalous GVD) and spectral shaping through $\beta_3$ pulse steepening/break-up.

As described above, in general, the system 20 generates a broadband spectral continuum using short spans of constant dispersion, dispersion-shifted fibers. The technique consists of two constituent processes: the compression of an optical pulse and the shaping of the spectrum associated with the pulse. The technique prescribes the design criteria for pulse and fiber properties that are required to obtain a characteristic broadened spectrum.

Pulse Compression Regime

The pulse compression scheme involves the use of one or more stages of the fiber 28 wherein a pulse provided by a source or pulse generator is compressed through the soliton compression effect. The number of stages depends on the initial pulse width and pulse energy, as well as the requirement that the final pulse width be shorter than 100 fsec.

Given an input pulse with a defined area and profile, the initial fiber dispersion and nonlinearity properties are chosen to ensure that a higher order soliton ($N \geq 1.5$) is present at the input to the fiber 28. The length of the fiber 28 is determined by the first optimal compression point of the order of soliton present at the input. The properties of the subsequent fiber(s) (i.e. fiber 30) are chosen to obtain a higher order soliton from the area of the compressed soliton present at the output of the previous stage.

To achieve the highest compression ratio per stage while at the same time minimizing the length of the fiber 28, one wants to maximize $$N\left( \propto \frac{\gamma St}{D} \right)$$

while minimizing the soliton period, $$z_0\left( \propto \frac{t^2}{D} \right).$$

Since the pulse area (S·t) is fixed by the source and amplifier specifications, the fiber properties are selected such that $\gamma/D$ is maximized while $1/D$ is minimized.

Pulse Shaping Regime

Figure 9A:
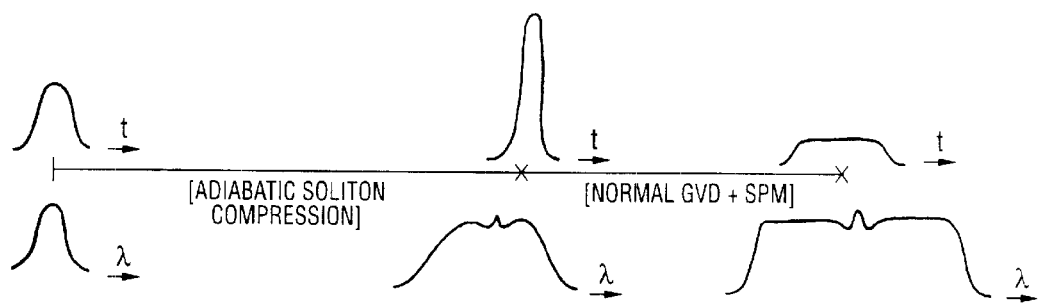
FIG. 9a illustrates a pulse shaped in the time and frequency domains (above and below the horizontal line, respectively) by the prior art.
Figure 9B:
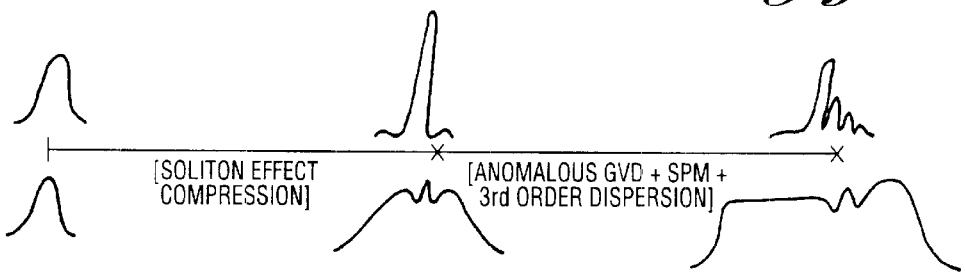
FIG. 9b is similar to FIG. 9a but its pulse is shaped in the time and frequency domains by the method and system of the present invention.

As illustrated in FIG. 9b, the pulse shaping regime involves the use of the 3rd order dispersion of the final stage of the compression fiber to induce pulse break-up and steepening which, through self-phase modulation, flatten and shape the final spectral profile. Third order dispersion effects on the pulse evolution are significant when the pulse width is short enough or, equivalently, the pulse's spectrum is broad enough, such that the total energy in the pulse cannot propagate at a single group velocity. The pulse then sheds the incongruous energy.

In order to achieve significant 3rd order effect shaping of the spectrum, the magnitudes of the 2nd order dispersion ($\beta_2$) and pulse-width-normalized 3rd order dispersion ($\beta_3/t$) in the final fiber 30 must be of the same order of magnitude. The t indicates the pulse width at the input to the final fiber 30.

Comparison With Other Techniques

Several other techniques for obtaining supercontinua in fiber have been demonstrated in the prior art as previously described. FIG. 9a indicates the mechanisms and associated pulse and spectral evolutions corresponding to the prior art techniques. The technique of the present invention is illustrated in FIG. 9b for comparison.

Differentiation

The technique of the present invention differs from the prior art techniques in the following respects:

1. It employs a multiple-stage soliton-effect compression scheme, which has the following benefits:
   It provides the highest compression rate per fiber length for a given input pulse width and energy;
   It can be achieved in standard, off-the-shelf fibers of prescribed dispersions; and
   It allows for greater power spectral densities to be obtained than are possible with adiabatic compression schemes.

2. It shapes the spectral profile through the effects of 3rd order dispersion on the pulse shape evolution in the final fiber span 30. In contrast to the prior art techniques, the spectral superbroadening occurs with the pump in the anomalous dispersion regime, wherein the 3rd order dispersion acts as the dominant factor limiting further pulse compression. The pulse is fragmented by the 3rd order dispersion and, through self-phase modulation induced by the high intensity portions of the fragmented pulse, the spectral profile is shaped into a broad, flat region. This scheme for spectral shaping has the following benefits:
   It occurs in the shortest length of fiber possible. In anomalous dispersion fiber, the interplay between 2nd order dispersion and self-phase modulation inhibits pulse broadening, thereby maintaining a high peak intensity and, hence, a high nonlinearity to generate new spectra;
   It can be achieved in standard, off-the-shelf fibers having an appropriate ratio between 2nd and 3rd order dispersions;
   It permits the flat features of the spectrum to be designed through the choice of the sign and magnitude of the 3rd order dispersion, rather than having the energy broaden the spectrum non-specifically; and
   It inhibits broadband phasematching that enhances the likelihood of mapping incoherent energy that is present in the vicinity of the input signal across the broadened spectrum.

As previously mentioned, the principal mechanisms of the present invention responsible for the continuum are self-phase modulation (SPM) and pulse shaping by the 2nd and 3rd order dispersion. SPM is the dominant nonlinear mechanism that broadens the spectrum of the input signal. The 2nd order dispersion of the DS fiber 30 creates a high peak-power pulse through soliton compression of the output from the SMF-28 fiber 28. The 3rd order dispersion sharpens the trailing (for $dD/d\lambda > 0$) or leading (for $dD/d\lambda < 0$) edge of the pulse, causing the asymmetric broadening to the anti-Stokes or Stokes sides of the seed center wavelength, respectively.

Figure 10:
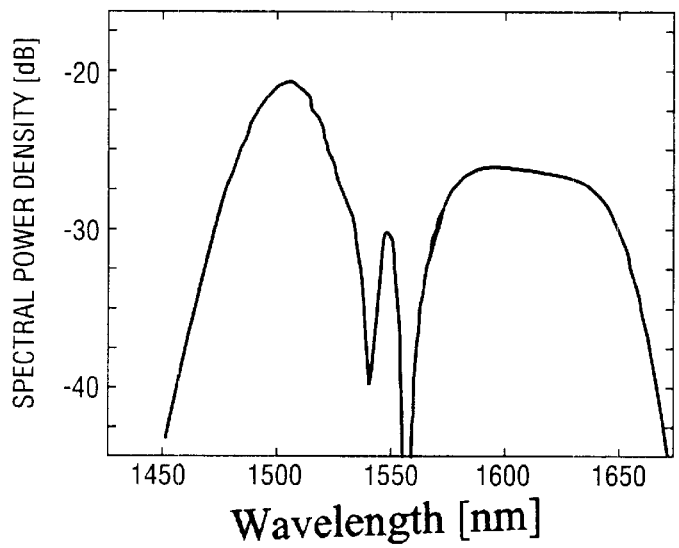
FIG. 10 is a graph of spectral power density vs. wavelength (nm) for a broadband spectral continuum generated in accordance with the present invention and with a negative dispersion slope.

FIG. 10 shows a simulation for the same experimental parameters, except with $dD/d\lambda < 0$ for the DS fiber 30. By reversing the sign of the 3rd order dispersion, the leading edge of the pulse is steepened, causing the continuum on the Stokes side of the seed wavelength to be broadened and flattened. This indicates the potential for tailoring the continuum by choosing the appropriate dispersion values for the continuum fiber. To optimize the spectral broadening, the 2nd order dispersion should be anomalous to achieve higher-order soliton compression over the length of the DS fiber 30. The minimum value of D is set so that the dispersive length is on the order of SC fiber length, and the maximum value is constrained so as to avoid significant Raman effects. The sign of $dD/d\lambda$ determines the direction of spectral broadening asymmetry while the absolute value affects the rate of pulse compression and edge steepening in relation to nonlinear phase accumulation through SPM.

Figure 11:
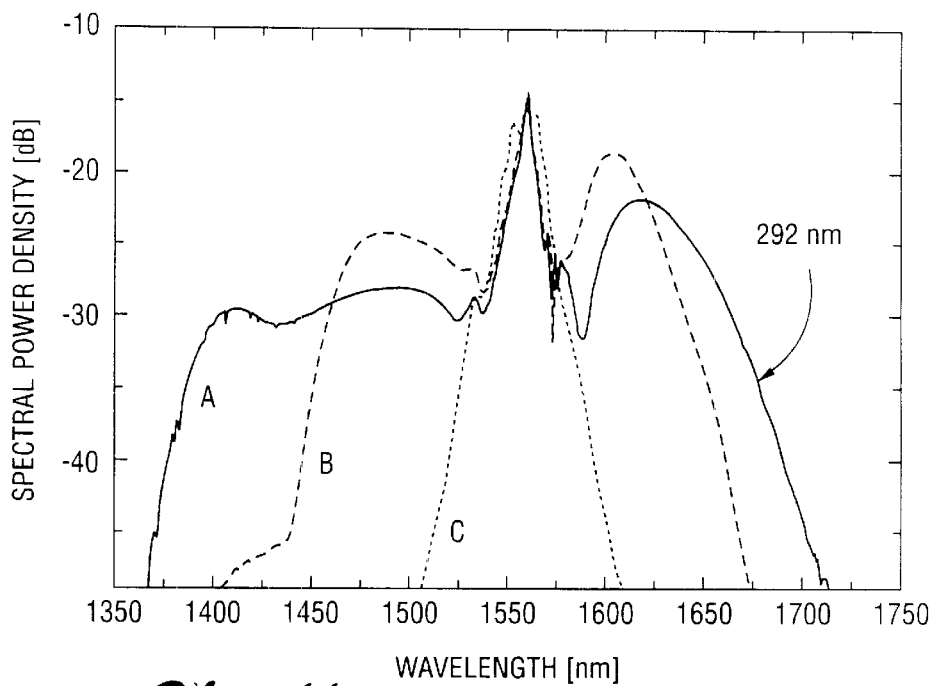
FIG. 11 illustrates three graphs of spectral continuum generated in: A-HiNL DS fibers; and B,C-conventional DS fibers; graphs A and C correspond to ~30 pJ input pulse energies and graph B corresponds to ~70 pJ pulse energy.

FIG. 11 compares the optimal SC spectra from 2 m of conventional DSF and Hi-NL fiber of approximately equal dispersion (D≅0.76 ps/nm-km). The Hi-HL fiber (i.e. A) provides a 292 nm spectrum at −20 dB for ~30 pJ/pulse input energies, with only ±1 dB power fluctuation over 100 nm from 1442 nm to 1542 nm in anti-Stokes region. The DSF (i.e. B) generates 206 nm of continuum for ~70 pJ/pulse energy with ±1 dB power fluctuation over 56 nm from 1465 nm to 1521 nm. The enhancement of nonlinearity reduces energy requirements by 40 pJ/pulse while simultaneously increasing the continuum bandwidth by 86 nm. For comparison, the much narrower spectrum from the DSF (i.e. C) for input energy ~30 pJ/pulse is also shown in FIG. 11.

Figure 12:
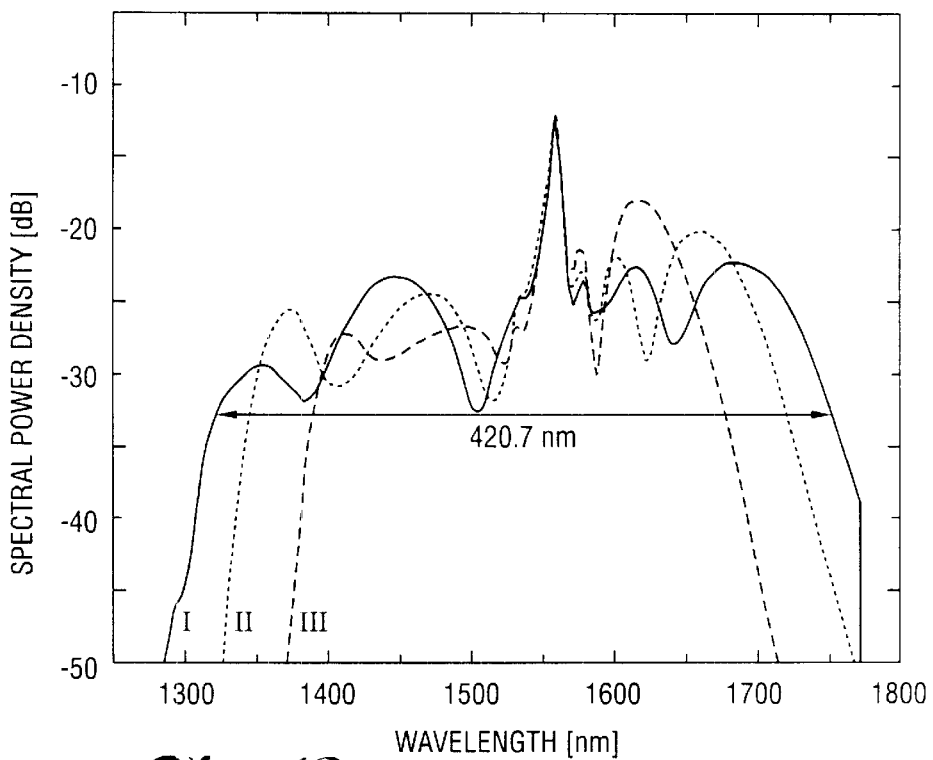
FIG. 12 illustrates three graphs of spectral continuum for optimal system configurations (HiNL fiber lengths, pulse energies): I(1 m, 99 pJ/pulse); II(1.5 m, 64 pJ/pulse); and III(2.5 m, 33 pJ/pulse)

At fixed pulse energies, bandwidths evolve roughly linearly with length until the broadening saturates. Beyond those points, spectral broadening is negligible while spectral features change significantly. FIG. 12 shows the SC spectral corresponding to the saturation points for three pulse energies. For pulse energy ~99 pJ (i.e. I), one obtains more than 420 nm of −20 dB bandwidth at an optimum length of 1 m.

For each value of pulse energy (i.e. II, ~64 pJ/pulse; III, ~33 pJ/pulse), the saturation point coincides with the spectrum developing variations that dip below −20 dB from the peak power density. Therefore, the saturation points dictate the optimum fiber length/pulse energy combinations that provide maximally broadened spectral without significant spectral distortion. The slope of the spectral bandwidth versus the fiber length for fixed pulse energies reflects the combined effects of increasing peak powers through pulse compression and enhanced self-phase modulation from the higher peak powers. For conventional DSF, therefore, the optimal combination in a short fiber length occurs for much higher pulse energies than in Hi-NL fiber.

In summary, DSF with the nonlinearity enhanced by a factor of 4.5 reduces the energy requirements for SC generation in 2 m of fiber to ~30 pJ/pulse while increasing the spectral broadening by 86 nm. By optimizing the fiber length/pulse energy combination, one obtains ~420 nm of bandwidth in 1 m of Hi-NL DSF (i.e. I in FIG. 12).

Figure 13:
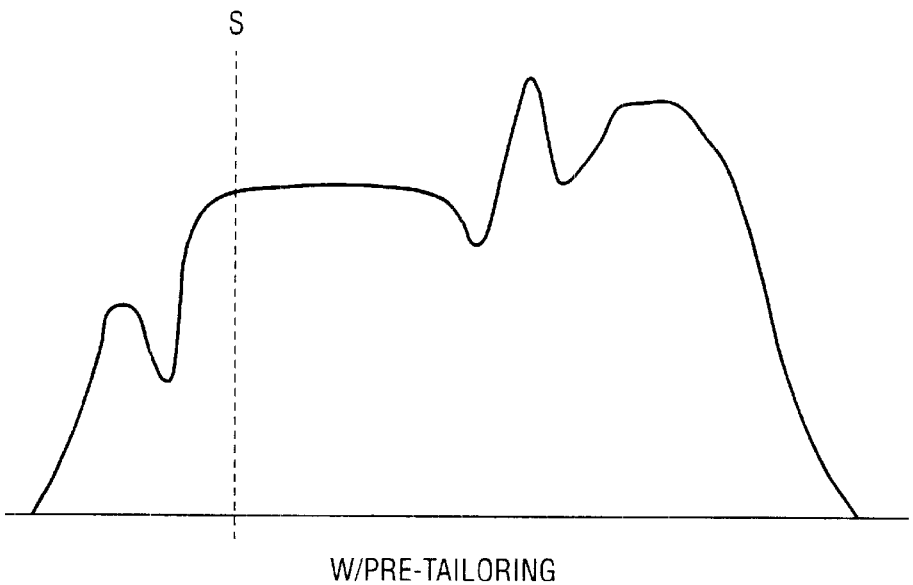
FIG. 13 is a graph of a broadband spectral continuum with pre-tailoring (i.e. tailoring the spectrum before pulse break-up) to improve and increase flatness of the spectrum.
Figure 14:
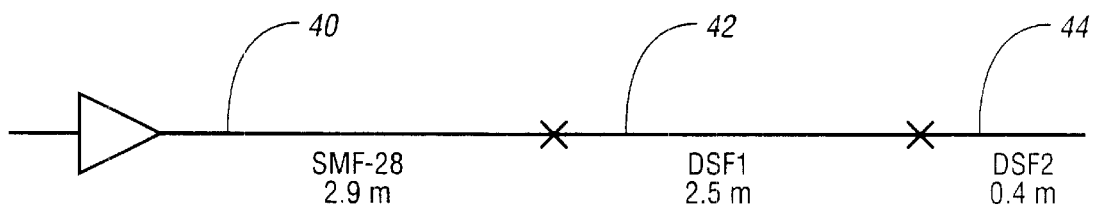
FIG. 14 is a schematic diagram of an optimum configuration of an optical fiber of the present invention and illustrating its various stages.

Referring now to FIG. 13, there is illustrated a graph of a broadband spectral continuum which has been "pre-tailored." That is, the spectrum of a soliton pulse has been "tailored" before the pulse break-up. This "tailoring" is done to improve flatness and increase the flat region bandwidth. Such optimization is provided by a SMF-28 section 40, a first section of DSF 42, and a second section of DSF 44 as illustrated in FIG. 14.

The SMF-28 section 40 fully utilizes soliton-effect compression and provides an optimum point of non-linear chirping.

The first section of DSF 42 (i.e. DSF1) enhances soliton compression due to lowered dispersion.

Finally, the second section of DSF 44 (i.e. DSF2) flattens the spectrum of the compressed soliton pulse by the combined effects of SPM and TOD (third order dispersion).

By controlling the fiber dispersion and length, one induces a proper secondary pulse to obtain the continuum of FIG. 13.

Pulse and Fiber Parameters for Continuum Generation

Figure 15:
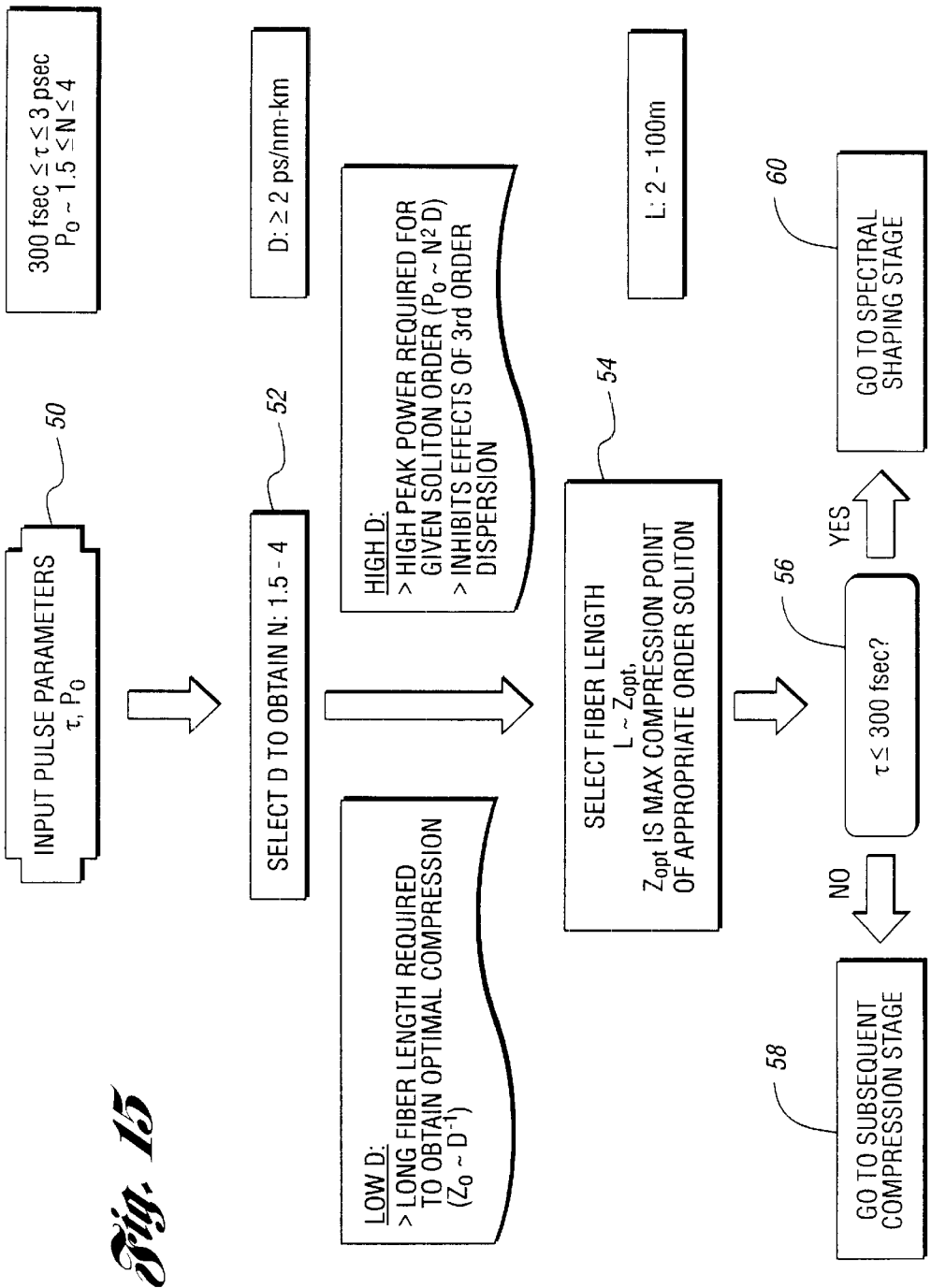
FIG. 15 is a block diagram flowchart illustrating the logic for determining various compression parameters of at least one pulse compression stage of an optical fiber.

As previously noted, the dispersion, dispersion slope, nonlinearity, and length parameters of fibers used in the compression and spectral-shaping stages determine the resulting continuum features. Referring now to FIG. 15, within the compression stage(s) 28, the fiber parameters are selected based on the incident pulse energy and pulse width as indicated at block 50, which depend on the output specifications of the pulse source 22 and amplifier 26. The dispersion of the fiber(s) 28 used in the compression stage(s) reconciles the requirements for obtaining a higher-order soliton (N≧1.5) for the available peak power and pulse width (D low) and achieving the optimal compression within a short fiber length (D high). Soliton orders should be maintained below N=4 to avoid energy loss to uncompressed wings and to avoid self-frequency shifting of pulses due to the Raman effect as indicated at block 52. For typical pulse widths of 0.3 to 3 psec, a fiber dispersion ≧2 ps/nm-km will provide pulse compression rates of 2–9× within a single compression stage, without inhibition by higher order effects. The length of a compression stage fiber 28 corresponds to the optimal compression point for the order of soliton launched in the fiber as indicated at block 54. By enhancing the nonlinearity of the compression fiber 28, its D can be increased by the same factor as the nonlinearity to maintain the same order of soliton. The fiber length required for optimal compression can then be decreased by the same factor. Pulse compression stages with progressively lower D's can be concatenated as indicated at block 58 to achieve a pulse width ≦300 fsec as indicated at block 56 prior to going the spectral shaping stage as indicated at block 60.

Figure 16:
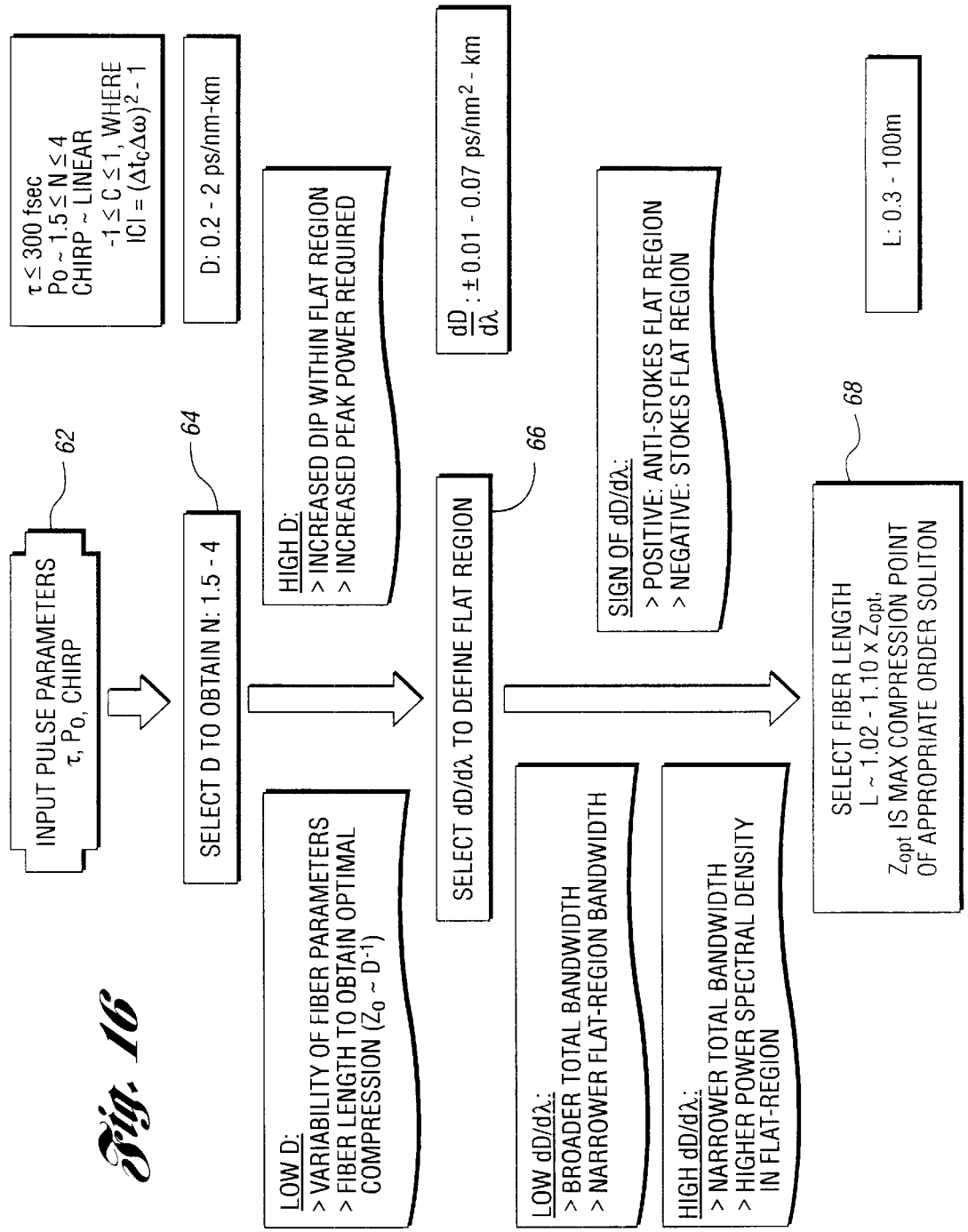
FIG. 16 is a block diagram flowchart illustrating the logic for determining various shaping parameters of a spectral shaping stage of the fiber.

Referring now to FIG. 16, the spectral shaping stage 30 takes advantage of the effects of 3rd order dispersion on the compressed pulse, which include edge steepening and pulse break-up. Because portions of the compressed pulse are of sufficiently high intensity to continue to induce SPM, the spectrum is shaped based on the pulse shape evolution. The fiber 30 used in the spectral-shaping stage of FIG. 16 has anomalous GVD to insure continued soliton-effect compression of the incident pulse or, as a minimum, to inhibit dispersive broadening.

The choice of fiber properties for the spectral shaping stage 30 depends on the pulse properties at the output of the final compression stage 28—the pulse width, peak power, and chirp as indicated at block 62. The desired pulse widths are $\tau_{FWHM} \leq 300$ fsec, to insure that the pulse experiences 3rd order dispersion effects within the spectral shaping stage 30. The peak powers should be such that the soliton order is in the range of 1.5 to 4 for the GVD that is selected for the spectral shaping stage 30. Any residual chirp from the compression stage(s) 28 will enhance or inhibit the compression within the shaping stage 30, as well as modify the final spectral evolution. In order to predict and account for its effects within the final stage 30, the chirp should be approximately linear across the high power portion of the pulse and on the order of unity.

The dispersion (D) of the spectral shaping stage fiber 30 is selected as indicated at block 64 to obtain a sufficiently high-order soliton so that the maximally compressed pulse will experience 3rd order dispersion effects. Depending on the pulse width incident on the spectral shaping stage, the order of soliton should compress the pulse to less than ~100 fsec within the length of the fiber. Once the soliton order requirements are satisfied, the D value is selected to reconcile the requirements for spectral flatness and fiber length. The spectral flatness is superior for low D (≦1 ps/nm-km), while the fiber length required to achieve maximum spectral broadening is shorter for higher D. In order to remain in the regime in which the 3rd order dispersion is the dominant higher-order effect, the D of the spectral-shaping stage should be <2 ps/nm-km.

Further shaping of the continuum spectrum depends on the sign and magnitude of the 3rd order dispersion. For anomalous GVD, positive (negative) dD/dλ asymmetrically broadens the spectrum to the anti-Stokes (Stokes) side of the seed pulse. For extremely low values of dD/dλ (≦0.005 ps/nm²-km), the spectrum broadens symmetrically and does not obtain the shaping benefits of 3rd order dispersion. For intermediate values, $0.01 \leq dD/d\lambda \leq 0.03$ ps/nm²-km, the broadest spectra are obtained, with a flatter asymmetrically broadened region resulting from increasing values of $dD/d\lambda$ as indicated at block 66. Higher values of 3rd order dispersion inhibit optimal pulse compression, yielding narrower continua, but ones that have very flat regions of high power spectral densities.

Finally, the length of the fiber comprising the spectral shaping stage 30 is selected at block 68 so that the broadened spectrum is extracted immediately following the incidence of pulse break-up. This is done to minimize interference between portions of the spectrum, which leads to modulation of the spectral profile. The optimal length is slightly longer (~2–10%) than that corresponding to the optimal compression length for the order of soliton launched into the spectral shaping stage 30.

The method and system of the present invention provides a TDM/WDM source that can provide pulses at multiple wavelengths and that can operate at repetition rates of 1–100 Gb/s or more. Continuum generation in fibers is a cost-effective candidate for a high-speed TDM/WDM source. A single mode-locked laser pumping the continuum is a cost-effective alternative over multiple laser combinations for 1–100 Gb/s single-channel repetition rates for a number of reasons.

First, only one short pulse source is required by the continuum, which turns out to be the most expensive part of the set up. Without the continuum fiber, on the other hand, the number of short pulse sources required for a WDM system would be equal to the number of channels.

Second, only the pump laser needs to be synchronized to data streams, and all the channels of the continuum will be synchronized automatically without additional timing jitter.

Third, a passive filter determines the channel spacing and stability of the wavelengths, which should be easier than actively stabilizing a series of sources.

Finally, the temporal width and bandwidth of each channel can be adjusted by adjusting the filtering, providing for a potentially tunable pulse width and tunable wavelength source for test and measurement purposes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for generating a broadband spectral continuum from a higher-order soliton pulse, the method comprising the steps of:
   compressing the higher-order soliton pulse in a temporal domain through soliton-effect compression to obtain a compressed soliton pulse having a spectrum; and
   breaking up the compressed soliton pulse to shape the spectrum of the compressed soliton pulse through higher order dispersion effects and self-phase modulation to obtain the broadband spectral continuum.

2. The method as claimed in claim 1 wherein the step of compressing includes the step of launching the higher-order soliton pulse into a first end of an anomalous dispersion fiber including at least one pulse compression stage having a length based on the order of the soliton pulse and a spectral shaping stage.

3. The method as claimed in claim 2 wherein the step of breaking up is performed adjacent a second end of the anomalous dispersion fiber in the spectral shaping stage.

4. The method as claimed in claim 3 wherein the spectral shaping stage is a dispersion-shifted optical fiber section of the anomalous dispersion fiber.

5. The method as claimed in claim 2 wherein the step of compressing is performed in multiple pulse compression stages of the anomalous dispersion fiber.

6. The method as claimed in claim 3 wherein the higher order dispersion effects include third order dispersion effects.

7. The method as claimed in claim 6 wherein the shape of the broadband spectral continuum is based primarily on the sign and magnitude of third order dispersion of the spectral shaping stage adjacent the second end.

8. The method as claimed in claim 7 wherein the shape of the broadband spectral continuum is also based on pulse width of the compressed soliton pulse immediately prior to the step of breaking up.

9. The method as claimed in claim 8 wherein the dispersion effects include second and third order dispersion effects, and wherein the magnitude of the second order dispersion and the magnitude of the third order dispersion normalized by the pulse width have substantially the same order of magnitude adjacent the second end of the anomalous dispersion fiber in the spectral shaping stage.

10. The method as claimed in claim 1 wherein the spectral continuum is greater than 10 nm wide.

11. A system for generating broadband spectral continuum from a higher-order soliton pulse, the system comprising:
    at least one pulse compression stage of anomalous dispersion fiber having a length based on the order of the soliton pulse for compressing the soliton pulse through soliton-effect compression to obtain a compressed soliton pulse having a spectrum; and
    a spectral shaping stage of the anomalous dispersion fiber optically coupled to the at least one pulse compression stage of anomalous dispersion fiber for breaking up the compressed soliton pulse adjacent an output end of the fiber to shape the spectrum of the compressed soliton pulse through higher order dispersion effects and self-phase modulation to obtain the broadband spectral continuum.

12. The system as claimed in claim 11 wherein the at least one pulse compression stage of anomalous dispersion fiber has a dispersion which is relatively constant therein.

13. The system as claimed in claim 11 wherein the anomalous dispersion fiber has a second pulse compression stage less than 100 meters in length.

14. The system as claimed in claim 13 wherein the second pulse compression stage is less than 10 meters in length.

15. The system as claimed in claim 11 wherein the dispersion effects include third order dispersions having a sign and a magnitude.

16. The system as claimed in claim 15 wherein the third order dispersions have a positive sign.

17. The system as claimed in claim 15 wherein the third order dispersions have a negative sign.

18. The system as claimed in claim 11 further comprising a plurality of pulse compression stages of anomalous dispersion fiber for compressing the soliton pulse through soliton-effect compression to obtain the compressed soliton pulse.

19. The system as claimed in claim 11 wherein the length of the at least one pulse compression stage of anomalous dispersion fiber is based on a minimal width of the compressed soliton pulse.

20. A method of making an anomalous dispersion fiber including at least one pulse compression stage for generating a compressed soliton pulse having incident pulse energy, $P_o$, and pulse width, $\tau$, from a higher-order, N, soliton pulse also having incident pulse energy, $P_o$, and pulse width, $\tau$, the fiber also including a spectral shaping stage for generating a broadband spectral continuum from the compressed soliton pulse, the method comprising the steps of:

- determining compression parameters including dispersion, D, and length, L, for the at least one pulse compression stage based on $P_o$ and $\tau$ of the higher-order soliton pulse;
- determining shaping parameters including D, L and $dD/d\lambda$ for the spectral shaping stage based on $\tau$, $P_o$, and chirp, C, of the compressed soliton pulse;
- providing the at least one pulse compression stage having the compression parameters and the spectral shaping stage having the shaping parameters; and
- optically coupling the at least one pulse compression stage and the spectral shaping stage together to obtain the anomalous dispersion fiber.

21. The method as claimed in claim 20 wherein 300 fsec $\leq \tau$ of the higher-order soliton pulse $\leq 3$ psec.

22. The method as claimed in claim 20 wherein $P_o$ of the higher-order soliton pulse $\sim 1.5 \leq N \leq 4$.

23. The method as claimed in claim 20 wherein D of the at least one pulse compression stage is $\geq 2$ ps/nm-km.

24. The method as claimed in claim 20 wherein L of the at least one pulse compression stage is 2–100 m.

25. The method as claimed in claim 20 wherein $\tau$ of the compressed soliton pulse $\leq 300$ fsec.

26. The method as claimed in claim 20 wherein $P_o$ of the compressed soliton pulse $\sim 1.5 \leq N \leq 4$.

27. The method as claimed in claim 20 wherein C is linear and $-1 \leq C \leq 1$.

28. The method as claimed in claim 20 wherein D of the spectral shaping stage is 0.2–2 ps/nm-km.

29. The method as claimed in claim 20 wherein $dD/d\lambda$ is $\pm 0.01$–0.07 ps/nm$^2$-km.

30. The method as claimed in claim 20 wherein L of the spectral shaping stage is 0.3–100 m.

31. The invention as claimed in claims 2, 11, or 20 wherein the fiber includes a high nonlinearity fiber.

32. The invention as claimed in claims 2, 11, or 20 wherein the fiber includes a polarization preserving fiber.

33. The invention as claimed in claims 2, 11, or 20 wherein the fiber includes a dispersion decreasing fiber.

* * * * *